Nov. 23, 1965   R. L. HETTINGER   3,219,391
REVOLVING WHEEL DISC COVER
Filed March 27, 1964
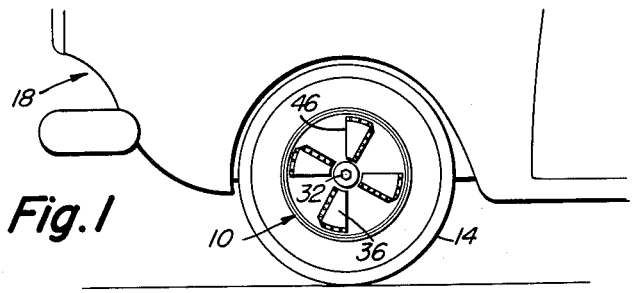
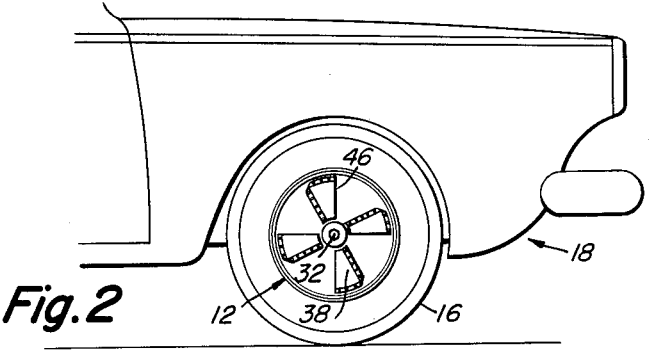
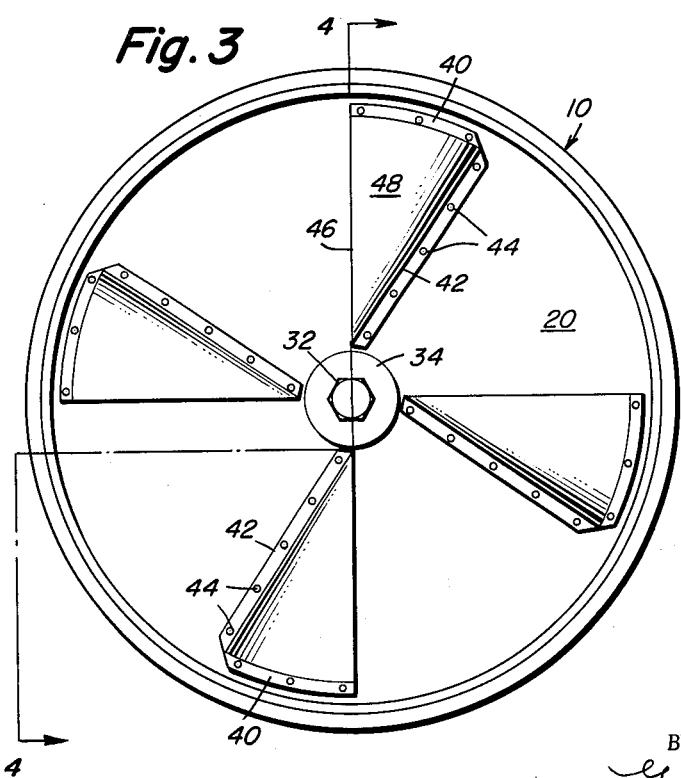
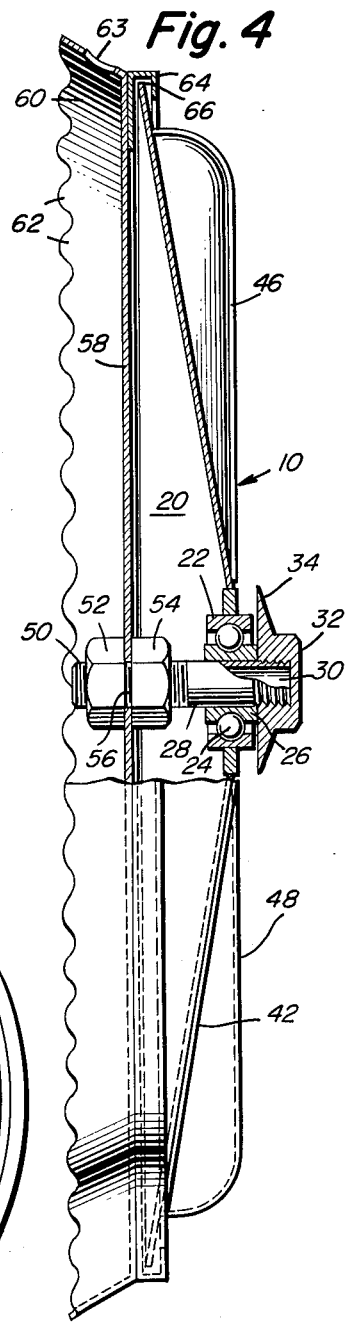
INVENTOR.
Richard L. Hettinger
BY
Gustave Miller

United States Patent Office 3,219,391
Patented Nov. 23, 1965

3,219,391
REVOLVING WHEEL DISC COVER
Richard L. Hettinger, Decatur, Ill., assignor to
Gustave Miller, Washington, D.C.
Filed Mar. 27, 1964, Ser. No. 355,192
1 Claim. (Cl. 301—37)

This invention relates to a revolving wheel disc cover for vehicle wheels for vehicles such as automobiles, motorcycles, bicycles, etc., which may be mounted on all or less than all of the wheels of the vehicle.

A further object of this invention is to provide a vehicle wheel disc cover which will revolve as the vehicle travels, wherein the disc cover has means extending into the air flow caused by the motion of the vehicle so as to cause the cover to revolve independently of the revolution of the wheel or the wheel disc secured thereon, whereby the cover will continue to revolve for at least a short period after the vehicle has come to rest, thus giving the vehicle a sense of motion for a short while after stopping.

A further object of this invention is to provide a revolving wheel disc cover wherein the air flow cooperating means will preferably be mounted to cause the disc cover to rotate in the opposite direction of the rotation of the wheel and wheel disc on which it is mounted, but which may also be mounted, without any structural change, to rotate in the same direction as the wheel and disc, but at a speed determined by the air flow rather than by the revolution of the wheel, and furthermore be mounted differently on some wheels than on other wheels, so that on some wheels, the covers may revolve in one direction, and other wheels, in the opposite direction, thus providing a bizarre sense of motion.

A further object of this invention is to provide revolving wheel disc covers wherein some covers may be mirror images of other covers so that, on opposite sides of the vehicle, the covers may be mounted to revolve in the same direction relative to the motion of the vehicle.

With the above and related objects in view, this invention consists in the details of construction and combination of parts, as will be more fully understood from the following description, when read in conjunction with the accompanying drawings in which:

FIG. 1 is a fragmentary elevation of the left side of the front end of a vehicle, showing this invention applied thereto.

FIG. 2 is a similar view of the right side.

FIG. 3 is an enlarged elevation view of one wheel disc cover of this invention.

FIG. 4 is a section on line 4—4 of FIG. 3.

There is shown at 10 and 12, mirror image forms of the wheel disc cover of this invention as applied to the left and righthand front wheels 14 and 16 of a vehicle such as an automobile 18.

The wheel disc cover 10, and 12 also, consists of a cover 20, preferably circular in outline, and also dished from its center wherein is secured an outer race 22 for ball bearings 24 rotating on an inner race 26. The inner race 26 is secured in any convenient, conventional manner as by being press fitted, on a shaft 28, which is hollow at 30 for lightness. The outer end of shaft 28 is threaded to receive a capped nut 32, preferably chrome plated, the cap 34 extending over and at least partially concealing the ball bearings 24 and races 22 and 26, thus tending to lessen the entry of dirt or debris thereon.

Equiangularly mounted about the covers 10 and 12 are a plurality of air scope 36 and 38, here shown as four in number, the scoops 36 being mirror images of scoops 38. As shown, each scoop 36 and 38 is somewhat triangular in outline, with two sides 40 and 42 secured, as by rivets, spot welding, or other conventional means 44, while the third side 46 is raised away from the cover 10 or 12. The outside 48 of the scoop 36 and 38 is streamlined as shown, so that the scoop edge side 46 provides a maximum resistance to airflow while the streamlined outside 48 provides a minimum resistance to airflow.

The other end of hollow shaft 28 is threaded at 50 for receiving nuts 52 and 54 and mounting it through a central shaftway 56 in a wheel disc 58 mounted on a dished flange 60 for attachment, in any conventional manner, as by latch means 62, to the wheels 14 and 16. A tire valve stem aperture 63 may be provided in the dished flange 60. On the circular edge of disc 58 there is provided a pocketing flange 64 within which the circular edge 66 of the covers 10 and 12 extend, to prevent air flow getting behind the covers 10 and 12 and possibly interfering with their operation.

In operation, the covers 10 and 12 are mounted on the discs and wheels 14 and 16, preferably as shown in FIGS. 1 and 2, with the open scoop edge 46 located above the center of revolution of the wheels 14 and 16, which coincides with the cap nuts 32, the open scoop edge 46 thus extending into the air flow of the moving vehicle 18, while, below the cap nut 32, the open edge faces away from the air flow. As thus mounted, the wheel covers 10 and 12 will revolve opposite to the direction of revolution of the wheels 14 and 16, and provide a sense of motion contrary to the revolution of the wheels 14 and 16.

They may also be mounted to revolve in the same direction as the wheels, by exchanging the right and left covers 10 and 12. In such case, there will still be a bizarre sense of motion to the observer, for the rotation will depend on the air flow rather than the revolution of the wheels, and they may revolve slower or faster than the wheels. In addition, the front wheel covers may be mounted to revolve in one direction, and the back wheel covers in the opposite direction, according to the whim of the operator. Or, by using a complete set of covers 10 only, or of 12 only, the direction of revolution on one side of the vehicle 18 will be opposite that on the other side.

Obviously, while the covers 10 and 12 and the nuts 32 may be chrome plated, any desired scheme of decoration may be provided on the covers, including varied colors or decorations which may appear to vary in appearance in accordance with their speed of revolution. When the vehicle comes to a stop, the covers will continue to revolve for a while at least providing a sense of motion, and with different decorations, the decoration may appear to change as the cover slows down.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A combination wheel disc and revolving wheel disc cover comprising a generally imperforate circular wheel disc, peripheral latch means on said disc for readily and detachably attaching said disc to a vehicle wheel on the side away from the vehicle on which it is mounted, a shaft, threaded means mounting said shaft at one end thereof at the radial center of said disc, a friction reducing bearing on said shaft adjacent the other end thereof, a nut threaded on said other end of said shaft, a dust protecting cap on said nut extending over said bearing, a generally circular imperforate dished wheel disc cover mounted on said bearing with its peripheral edge closely adjacent the peripheral edge of said wheel disc, and a plurality of substantially triangular shaped streamlined air scoops secured equiangularly on and about the outer surface of said wheel disc cover, said triangular air scoops being secured along two of their edges to said wheel disc cover, the third side of said air scoop extending away from the outer surface of said wheel disc cover and into the air flow past said cover when the vehicle wheel is rotating and causing rotation of said cover at a rate different from the rate of rotation of the vehicle wheel, said rotation continuing for a time after the vehicle wheel has stopped rotation, said disc and disc cover being readily mountable on the vehicle wheel for rotation of said cover in the direction opposite to the direction of rotation of the vehicle wheel said shaft in the center of said wheel disc being hollow, and a pocketing flange on said wheel disc peripheral edge overlapping and enclosing said peripheral edge of said wheel disc cover generally preventing outside air flow between said wheel disc and the inner surface of said wheel disc cover.

References Cited by the Examiner

UNITED STATES PATENTS

| | | | |
|---|---|---|---|
| 896,885 | 8/1808 | Bergeron | 40—129 |
| 2,169,237 | 8/1939 | Gasco. | |
| 2,237,164 | 4/1941 | Rosenberg. | |
| 2,762,469 | 9/1956 | Lyon | 301—37 X |
| 2,997,344 | 8/1961 | Whiteman | 301—37 |
| 3,005,906 | 10/1961 | Butler | 301—108 X |

FOREIGN PATENTS 200,689   7/1923   Great Britain.

ARTHUR L. LA POINT, *Primary Examiner.*